3,459,798
Patented Aug. 5, 1969

3,459,798
PROCESS FOR PREVENTING CAKING OF ADIPIC ACID, AND PRODUCT
James Turnley Lassiter, Orange, Tex., assignor to E. I. du Pont de Nemours and Company, Wilmington, Del., a corporation of Delaware
No Drawing. Filed June 23, 1966, Ser. No. 559,715
Int. Cl. C07c 55/14, 55/04
U.S. Cl. 260—537                         6 Claims

ABSTRACT OF THE DISCLOSURE

Adipic acid is rendered free flowing by the addition of 25–200 p.p.m. of an anticaking agent which is an acyclic saturated monobasic acid containing 10–22 carbon atoms or an acyclic saturated dibasic acid containing 10–14 carbon atoms or mixture of the aforesaid acids.

---

This invention relates to a process for preventing the caking of pure adipic acid and to free-flowing adipic acid, and, more particularly, to incorporating with adipic acid very small amounts of certain organic acids as anticaking agents.

Adipic acid (1,4-butanedicarboxylic acid) is a white, crystalline solid which may be prepared by oxidizing cyclohexane to cyclohexanol and cyclohexanone, followed by further oxidation of the alcohol and ketone with nitric acid. Adipic acid is used, for example, in the manufacture of polyamides and as a food additive.

After adipic acid is prepared, it is usually necessary to store it in large quantity lots and/or ship it to another location before using it in a manufacturing process. When stored, pure adipic acid usually becomes caked. Accordingly, it must be processed after storage to break up the caked material each time it is to be moved. Obviously, when, as is the usual case, the adipic acid is stored at the point of origin, shipped to the manufacturing location and stored there before use, processing at each point to break up the caking is a costly and time-consuming operation.

It has now been discovered in accordance with the present invention that adipic acid can be treated to make it free flowing, i.e., to prevent caking, by intimately mixing with the adipic acid about 25–200 p.p.m. of a higher molecular weight organic acid. These additives can be acyclic saturated monobasic acids of 10–22 carbon atoms or acyclic saturated dibasic acids of 10–14 carbon atoms.

It will be appreciated by those skilled in the art that it is indeed surprising that a concentration of additive as low as 25 p.p.m. would have the beneficial effect of eliminating caking of adipic acid. While for most uses of adipic acid such a low content of the additive would not be detrimental, this concentration can be lowered, if desired, after storage and before use of the adipic acid. For example, stearic acid is less soluble in water than is adipic acid and, accordingly, under controlled solubility conditions a large portion of the stearic acid can be removed by filtration of an aqueous solution of adipic acid prior to formation of polyamide. When a dicarboxylic acid is used as the anticaking additive, additive at these low levels can go into the polyamide with no deleterious effect upon that polymeric product.

The acids employed in the process of this invention, can be straight-chained or branch-chained. It is furthermore obvious that mixtures of the additives can be employed. Illustrative of specific additives useful in this process for rendering adipic acid free flowing are decanoic acid, undecanoic acid, lauric acid, tridecanoic acid, myristic acid, pentadecylic acid, palmitic acid, margaric acid, stearic acid, nondecnoic acid, arachic acid, behenic acid, decanedioic acid, undecanedioic acid, dodecanedioic acid, and tetradecanedioic acid.

Stearic acid useful in this process includes the commercially-available mixtures such as the "single-pressed" grade, composed of about 45% palmitic acid, 50% stearic acid, and 5% oleic acid.

The anticaking additive can be added to the adipic acid in a number of ways, for example, as a solid or as an aqueous slurry during slurry refining or during drying, thus eliminating the necessity for an additional manufacturing step. Alternatively, the anticaking agent can be added by hot dry-blending or by spray drying, if desired.

The preferred method of incorporating anticaking agent into adipic acid is by adding to the adipic acid an aqueous slurry of the additive, prior to drying the adipic acid, since such slurries are easier to handle than solids. However, slurries often are unstable on standing, tending to agglomerate. It has been found that emulsions of about 2.5–7.5% stearic acid in water are stable if formed at temperatures above room temperature (50° C., for example) in the presence of a trace quantity of inorganic cations capable of ionizing the acid function of stearic acid. Illustrative of such cations are $NH_4^+$, $Ca^{+2}$, $Na^+$, etc.

It is immaterial, for the purpose of forming a stable emulsion, in what chemical form the cations are introduced, so long as the cations are free to ionize the acid functions of the additive. Thus, such compounds as ammonium hydroxide, calcium carbonate, etc., can be used. The preferred inorganic emulsifier is ammonium hydroxide.

There is a maximum on the amount of additive and emulsifier employed in the aqueous slurry, beyond which the handling properties are diminished to a point where the slurry is no longer convenient to handle. Thus, when more than trace amounts of emulsifier, or more than about 10% of anticaking agent are present, the emulsion is thickened, and handling is difficult.

The concentrations of additive and emulsifier used in the aqueous dispersion, as well as the temperature, depend upon the materials used, and are chosen so as to form an easily handleable stable emulsion.

The following examples are presented to illustrate but not to restrict the present invention. Percentages and parts are expressed by weight unless otherwise noted.

The adipic acid employed was very pure (well over 99.5% adipic acid on a water-free basis). It will be recognized that minor amounts of water may be present without affecting the free-flowing nature of the product of this invention. A typical batch thereof included the following impurities at or below the indicated levels: 1 p.p.m. ash, 1 p.p.m. iron, 25 moles per million volatile acids, 20 moles per million succinic acid. After centrifuging and drying in a rotary kiln hot air drier at 95–100° C. for about 30 minutes, the water content of the adipic acid was less than about 0.2%.

EXAMPLE I

To a stirred slurry of adipic acid in water was added 50 p.p.m. (based on the adipic acid) of a solution of "stearic acid" in methanol. The "stearic acid" was a commercial product of the following composition: 89% stearic acid, 9% palmitic acid, and 1% myristic acid.

The mixture was then centrifuged and dried in a rotary drier for 30 minutes at 95–100° C. The product was then stored for 10 days at 25° C. and 100% relative humidity. No caking was observed and the material flowed freely.

A similar batch of adipic acid to which no stearic acid had been added became severely caked under the same conditions.

EXAMPLE II

A solution of "stearic acid" in chloroform was sprayed onto a batch of dried adipic acid in a rotary kiln (50 p.p.m. based on the adipic acid). The composition of the commercial grade of "stearic acid" used was 49% palmitic acid, 46% stearic acid, 2% myristic acid, and 3% oleic acid.

After blending for 30 minutes at 50–100° C. in the drier, the material was stored under the conditions of Example I. After storage the material flowed freely, whereas a control batch was found to be severely caked.

EXAMPLE III

The adipic and stearic acids were identical to those of Example II. There was added to the adipic acid 50 p.p.m. of the stearic acid as a dry powder, and the materials were blended for 30 minutes at 50–100° C. in the dryer. The material flowed freely after storage under the conditions of Example I.

EXAMPLE IV

Two identical batches of adipic acid were prepared. Into one there was semicontinuously added to the adipic acid wet cake after centrifuging, at a point before the admission into the dryer, 75 p.p.m. of "stearic acid" of the following composition: 82.5% stearic acid, 2.5% myristic acid, 0.5% pentadecanoic acid, 13% palmitic acid, 1% margaric acid, and 0.5% oleic acid.

Each batch was dried in the rotary kiln in the usual manner, and each was loaded into a separate compartment of a railroad hopper car. The car was then shipped and stored for a period over 30 days. At the end of this period the material in the compartment containing the untreated acid was severely caked and required the use of mechanical devices to loosen and unload it. In comparison, the material in the compartment containing the stearic acid-treated batch was not caked, and flowed freely and was unloaded without requiring mechanical devices.

EXAMPLE V

A mixture of branch-chained acyclic saturated organic acids (available commercially from Emery Chemical Company as "isostearic acid") was added at a 50 p.p.m. level to a batch of adipic acid according to the spray technique of Example II.

The mixture was stored according to Example I, after which the adipic acid was found to be free flowing.

EXAMPLE VI

A dibasic acid, 1,12-dodecanedioic acid, was added at a level of 50 p.p.m. to a batch of adipic acid according to the spray technique of Example II, with the exception that acetone was employed as the solvent for the spray solution.

Blending and storage similar to that of Example I left the adipic acid free flowing, while a control batch without the dibasic acid additive was severely caked.

EXAMPLE VII

A dibasic acid, 1,12-dodecanedioic acid, was added as a solid (less than 200 mesh) to adipic acid wet cake at the 50 p.p.m. level according to the procedure of Example III.

After storage in a similar manner, the treated adipic acid was free flowing, whereas an untreated control batch was severely caked.

EXAMPLES VIII–XI

In these experiments 100 p.p.m. of the dibasic acids, 1,11-undecanedioic acid and 1,10-decanedioic acid, and the very high molecular weight monobasic acids, arachic acid and behenic acid (Examples VIII, IX, X and XI, respectively), were added to adipic acid as dry powders of less than 200 mesh according to the procedure of Example III.

In Examples VIII and IX the blending was carried out at about 95° C. and in Examples X and XI at above 70° C., each for 30 minutes.

After storage under the conditions of Example I, each of these batches of treated adipic acid was free flowing.

EXAMPLES XII–XIII

In these experiments 50 p.p.m. of the odd-numbered saturated monobasic acids, tridecanoic acid and nonadecanoic acid, respectively, were added to adipic acid according to the procedure of Example II. The purity of each additive was quite high, that of tridecanoic acid being over 99%. Results similar to those of Example I were obtained.

EXAMPLE XIV

Approximately 5 parts of stearic acid of Example IV and 95 parts of water were dispersed with ammonium hydroxide (about 10 microliters of ammonium hydroxide containing 30% ammonia per 150 grams of emulsion) at about 50° C.

This emulsion was pumped into the adipic acid wet cake as in Example IV, at a level of about 50 p.p.m. of "stearic acid" based upon adipic acid.

No caking was observed under the conditions of Example I.

The foregoing detailed description has been given for clearness of understanding. The invention is not limited to the exact details shown and described since obvious modifications will occur to those skilled in the art.

I claim:

1. A process for rendering pure adipic acid free flowing which comprises adding about 25–200 p.p.m. of an anticaking agent to the adipic acid, said agent being selected from the class consisting of acyclic saturated monobasic acids containing 10–22 carbon atoms, and acyclic saturated dibasic acids containing 10–14 carbon atoms wherein said anticaking agent is added as an aqueous slurry which has been emulsified by a trace amount of an emulsifier comprising an inorganic cation capable of ionizing said acid additive thereby rendering said adipic acid free flowing.

2. A process according to claim 1 wherein said emulsifier is ammonium hydroxide.

3. A free-flowing composition consisting essentially of adipic acid and about 25–200 p.p.m. of an anticaking agent selected from the class consisting of acyclic saturated monobasic acids containing 10–22 carbon atoms and acyclic saturated dibasic acids containing 10–14 carbon atoms.

4. A composition according to claim 3 wherein said agent is stearic acid.

5. A composition according to claim 3 wherein said agent is 1,12-dodecanedioic acid.

6. A composition according to claim 3 wherein said agent is lauric acid.

References Cited

UNITED STATES PATENTS

| | | | |
|---|---|---|---|
| 2,245,040 | 6/1941 | Marks | 252—384 |
| 3,131,068 | 4/1964 | Grief | 252—384 |
| 3,140,300 | 7/1964 | Gans et al. | 252—384 |
| 3,301,636 | 1/1967 | Otrhalek | 252—384 |

LORRAINE A. WEINBERGER, Primary Examiner

V. GARNER, Assistant Examiner

U.S. Cl. X.R.

260—531